(12) United States Patent
Hairapetian

(10) Patent No.: US 8,699,616 B1
(45) Date of Patent: Apr. 15, 2014

(54) COMMUNICATION SYSTEMS BASED ON HIGH-GAIN SIGNALING

(71) Applicant: StarPort Communications, Inc., Newport Beach, CA (US)

(72) Inventor: Armond Hairapetian, Newport Coast, CA (US)

(73) Assignee: Starport Communications, Inc., Newport Beach, CA (US)

( * ) Notice: Subject to any disclaimer, the term of this patent is extended or adjusted under 35 U.S.C. 154(b) by 0 days.

(21) Appl. No.: 13/847,924

(22) Filed: Mar. 20, 2013

Related U.S. Application Data

(60) Provisional application No. 61/801,503, filed on Mar. 15, 2013.

(51) Int. Cl.
*H04L 25/34* (2006.01)

(52) U.S. Cl.
USPC .......................................................... 375/286

(58) Field of Classification Search
USPC ................................................ 375/286, 292
See application file for complete search history.

(56) References Cited

U.S. PATENT DOCUMENTS

| | | | |
|---|---|---|---|
| 6,424,194 B1 | 7/2002 | Hairapetian | |
| 2003/0107411 A1* | 6/2003 | Martin et al. | 327/100 |
| 2004/0208645 A1* | 10/2004 | Buckman | 398/186 |
| 2010/0232541 A1 | 9/2010 | Fukaishi et al. | |
| 2010/0239038 A1* | 9/2010 | Seyedi-Esfahani | 375/261 |
| 2012/0208476 A1* | 8/2012 | Tanoue et al. | 455/95 |
| 2012/0251032 A1* | 10/2012 | Kato | 385/3 |

OTHER PUBLICATIONS

Bliss, Will; "Signaling Terminology; PAM-M and Partial Response Precoders. IEEE 802.3 100Gb/s Backplane and Cooper Cable Study Group,"; www.broadcom.com; Mar. 7, 2011; 18 pages.
Kanda, Kouichi et al.; "1.27Gb/s/pin 3mW/pin Wireless Superconnect (WSC) Interface Scheme,"; ISSCC 2003, Session 10, High Speed Building Blocks, Paper 10.7; *2003 IEEE International Solid-State Circuits Conference*; Feb. 11, 2003; 10 pages.
Luo, Lei et al.; "3Gb/s AC-Coupled Chip-to-Chip communication Using a Low-Swing Pulse Receiver,"; ISSCC 2005, Session 28, Clocking and I/O, 28.7; *2005 IEEE International Solid-State Circuits Conference*; Feb. 9, 2005; pp. 522-523, 614.
Yuminaka, Yasushi et al.; "A Ternary Partial-Response Signaling Scheme for Capacitively Coupled Interface,"; *40th IEEE International Symposium on Multiple-Valued Logic*; 2010; pp. 331-336.

* cited by examiner

*Primary Examiner* — Don N Vo
(74) *Attorney, Agent, or Firm* — Kilpatrick Townsend & Stockton LLP

(57) ABSTRACT

Systems, methods and apparatus for transferring data at a high rate. Examples may provide transmitters and receivers that transfer data at a high rate by encoding the data to be transmitted such that the circuits of the transmitter and receiver operate in their high-gain states. The encoded signal may have an average value that is independent of the data that is conveyed by the transmitted signal. In other examples, the encoding may shape the data signal into a data signal having a high-pass characteristic. When the high-pass encoded signal is transmitted through a channel having a low-pass transfer function, the resulting output signal may have much lower ISI compared to a un-encoded input signal. Transmit and receive circuits, such as amplifiers, laser, and photo-diodes, are biased to operate in their high-gain regions when receiving the encoded data in order to provide high-bandwidth and shorter transition times.

30 Claims, 18 Drawing Sheets

COMMUNICATION SYSTEMS BASED ON HIGH-GAIN SIGNALING

CROSS-REFERENCES TO RELATED APPLICATIONS

This application claims priority from U.S. provisional application No. 61/801,503, filed Mar. 15, 2013, which is incorporated by reference.

BACKGROUND

The amount of data transferred among electronic devices has been increasing rapidly over the years, and this rate of increase shows no signs of abating. In particular, the amount of data transferred by servers, routers, and backplanes has exploded with the increase in popularity of on-demand video and other such data-intensive applications. Present devices are struggling to keep pace with this increase in data traffic. Accordingly, new devices are being developed that will be better able to cope with these high volumes. One aspect of this is the desire to increase the rate of data transfers between these devices.

Currently, data is typically transferred among devices using non-return to zero (NRZ) signaling. Typical data rates may be in the 5-10 Gbps range, with a 10-20 GHz clock frequency. But now engineers are looking for solutions that would be capable of transferring data at the 50 to 100 Gbps range and beyond.

Unfortunately, NRZ signaling does not appear to be suitable at these higher rates. When an NRZ binary signal is passed through a channel having low-pass characteristics, the resulting signal may have excessive attenuation at its high-frequency components, which may lead to increased noise and inter-symbol interference (ISI), thereby making data recovery more difficult.

For these reasons, alternate encoding schemes are being explored, such as Pulse-amplitude modulation (PAM) or duo-binary encoding schemes. But these methods of encoding still have speed limitations and have drawbacks of their own such as increase in circuit complexity to implement. For example, decoding of these signals may need to be done using a digital-signal processor (DSP) or other area and power intensive circuits. Moreover, the transmitter and receiver circuitry for these implementations may require large bandwidths and a corresponding increase in power dissipation.

Thus, what is needed are systems, methods and apparatus for transferring data at a high rate where the transmitting and receiving, as well as the encoding and decoding can be done in a space and power efficient manner.

SUMMARY

Accordingly, embodiments of the present invention may provide systems, methods and apparatus for transferring data at a high rate where the transmitting and receiving, as well as the encoding and decoding, can be done in a space and power-efficient manner. Exemplary embodiments of the present invention may provide transmitters and receivers that transmit and receive data at a high rate by encoding the data to be transmitted in a way that allows the circuits of the transmitter and receiver to operate in their high-gain states.

Embodiments of the present invention may use High-Gain Signaling to achieve these high data rates. High-Gain Signaling may be defined as a combination of high-pass shaping of the signal spectrum and high-gain operation of the circuits and active components. In various embodiments of the present invention, the high-pass shaping of the signal may be done by encoding the signal, where the encoding may be such that the encoded signal has an average value that is independent of the data that is conveyed by the transmitted signal. In these and other embodiments, the encoding may convert a data signal having a low-pass or flat characteristic into a data signal having a high-pass characteristic, where the converted signal has a reduced or absent DC component. In an embodiment of the present invention, a binary signal may be encoded into a multi-level signal having a mid-level, one or more high levels, and one or more low levels. Bits at a high level have corresponding bits at a low level. In a specific embodiment of the present invention, the binary digital signal may be an NRZ binary signal, though in other embodiments, the digital signal may be other types of digital signals. In this specific embodiment, the NRZ signal may be encoded as a dicode signal, though in other embodiments, the encoded signal may be other types of signals, such as modified dicode or modified duobinary signals.

Again, the encoding may be such that the encoded signal has an average value that is independent of the data that is conveyed by the transmitted signal. In specific embodiments, this effectively removes the DC component of the data signal. In this way, circuits and other active components may be conditioned or biased such that this average value falls within the circuits' high-gain or linear operating range. Data bits, which may be variations from the average, may then drive the circuits through their high-gain or linear operating range. By providing biasing conditions that place the circuits in their linear or small-signal operating range, the circuits operate at a high bandwidth. This further may allow power consumption to be reduced. Furthermore, given that typical communication channels exhibit low-pass characteristics, the high-pass characteristic that results from the encoding of the data signal provides for advantageous equalization when the signal travels through the channel. This minimizes ISI and improves overall system performance. Yet further, removing the DC allows the circuits to be capacitively AC coupled which in some applications can enhance overall performance of the communication system. Again, the combination of this high-gain operation with the above high-pass shaping achieved as a result of encoding may form the basis of High-Gain Signaling, which may be employed by embodiments of the present invention.

For example, in various embodiments of the present invention, transmitting and receiving circuits may include amplifiers. These amplifiers may be biased such that input differential pairs are balanced when incoming encoded data is at the average value. High and low data bits then drive each amplifier away from its balanced point, and the amplifier amplifies the signal without departing its linear or non-saturated region. Similarly, lasers and photo-diodes that are used as parts of transmitters and receivers may be biased near a midpoint of their operating range placing them in their high-gain state when data is at the average value. Data may then drive these components away from their midpoints, but still in their linear region. This again allows for high-bandwidth operation of these amplifiers and components, and may allow their bias currents to be reduced. It is to be understood that circuits and active components that are conditioned to operate in their high-gain or linear region may not do so exclusively at all times, and there may be conditions, such as start-up or other boundary conditions or separate modes of operation, under which they depart from their high-gain state.

From a time-domain perspective, it may be observed that these circuits operate in their linear or small signal ranges. This prevents their various stray capacitances from becoming fully charged or discharged, and keeps active components out of their saturation regions. This allows a fast reaction to changes in the input data. From a frequency spectrum perspective, this embodiment of the encoding shifts an input signal having a low-pass or flatter "white" characteristic to an encoded signal having a high-pass characteristic. The encoded signal may also have a reduced or absent DC component. Again, this keeps the transmitting and receiving circuits operating in their linear or small signal ranges, which is the operating range where these circuits have their highest bandwidth. This allows fast reactions to change in the input data providing for high-speed data transmission. Further, the high-pass characteristic of the encoded signal introduces some equalization as the signal travels through a communication channel having low-pass characteristics.

Embodiments of the present invention may provide encoders and decoders that may not require complicated DSPs or other area and power intensive circuits. This may simplify circuit design, save die area, and reduce power consumption.

In various embodiments of the present invention, the transmitting and receiving circuits may include serializing and deserializing circuits. A serializing circuit in the transmitting circuit may receive lower-speed data in parallel and convert it to higher-speed serial data for encoding and transmission. Similarly, a deserializer may be placed in the receiving circuit after the decoding circuits to convert the higher-speed serial data to lower-speed parallel data that is more readily handled by circuits associated with the receiver.

Transmitters and receivers provided by embodiments of the present invention may be used to facilitate data transfers between circuits such as servers, memories, switches, routers, and transport equipment.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
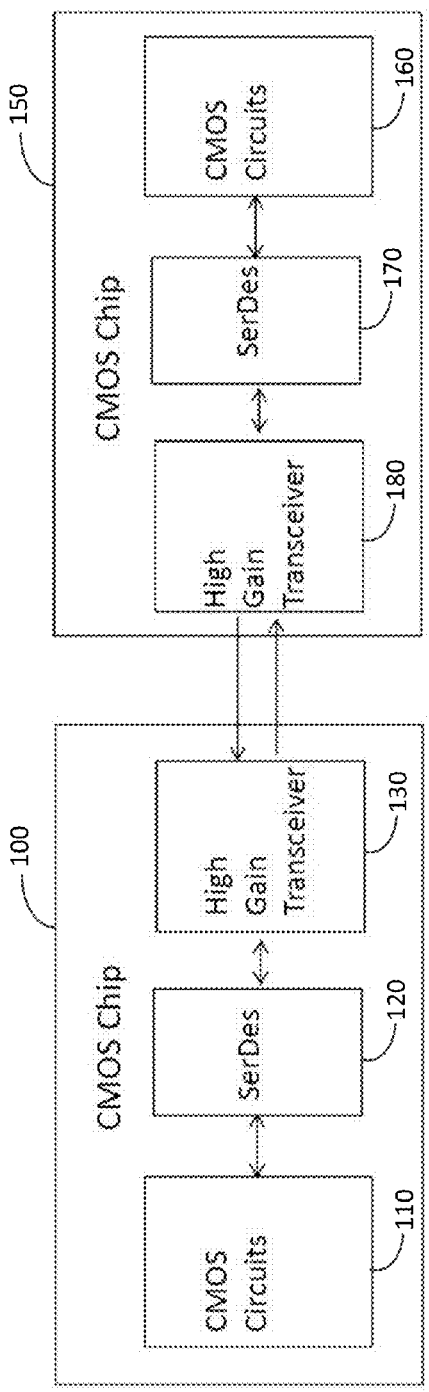
FIG. 1 illustrates two integrated circuits communicating with each other according to an embodiment of the present invention.

FIG. 1 illustrates two integrated circuits communicating with each other according to embodiments of the present invention. This figure, as with the other included figures, is shown for illustrative purposes and does not limit either the possible embodiments of the present invention or the claims.

In this figure, integrated circuit 100 may communicate with integrated circuit 150 via high-gain transceivers 130 and 180. Integrated circuit 100 may include circuits 110 that couple to serializer-deserializer circuit 120. Serializer-deserializer circuit 120 may transmit and receive parallel data to and from circuits 110. Serializer-deserializer 120 may transmit and receive high-speed serial data to and from high-speed transceiver 130.

High-gain transceiver 130 may transmit and receive serial data to and from high-gain transceiver 180 in integrated circuit 150. High-gain transceiver 180 may similarly transmit and receive serial data to and from serializer-deserializer circuit 180, which may transmit and receive parallel data to and from circuits 160.

While integrated circuits 100 and 150 are shown as having similar topologies, in other embodiments of the present invention, integrated circuits 100 and 150 may have different topologies. Integrated circuits 100 and 150 may be circuits such as servers, memories, switches, routers, transport equipment, and other types of circuits that are employed in data communication systems.

While integrated circuits 100 and 150 are shown in this example as being Complementary Metal-Oxide-Semiconductor (CMOS) integrated circuits, in other embodiments of the present invention, these circuits may be formed using Bipolar, Bipolar-Complementary Metal-Oxide-Semiconductor (BiCMOS), High Electron Mobility Transistor (HEMT), Pseudomorphic High-Electron-Mobility Transistor (pHEMT), Heterojunction Bipolar Transistor (HBT), Metal Semiconductor Field Effect Transistor (MESFET), or other manufacturing processes. Similarly, while circuits 110 and 160 are shown as being CMOS circuits, in other embodiments of the present invention, these circuits may be formed using bipolar, BiCMOS, HEMT, pHEMT, HBT, MESFET, or other manufacturing processes.

High-gain transceiver 130 on integrated circuit 100 may communicate with high-gain transceiver 180 on integrated circuit 150. In other embodiments of the present invention, one of these circuits may be a receiver, while the other may be a transmitter. The signal path between high-gain transceiver 130 and high-gain transceiver 180 may be single-ended or differential. Further, this single-ended or differential signal path may be DC or directly coupled or these paths may be AC coupled through capacitors. These connections may be formed using conductive wires such as copper, or fiber optics, or other suitable media. These connections may also be wireless, they may rely on capacitive or inductive coupling, or they may be other types of connections.

High-gain transceivers 130 and 180 may include encoders and decoders, as well as drivers and receiver circuits. High-gain transceivers 130 and 180 may receive high-speed binary data, and encode the data for improved transmission. These transceivers may also receive encoded data, and decode the data to high-speed binary data. An example is shown in the following figure.

Figure 2:
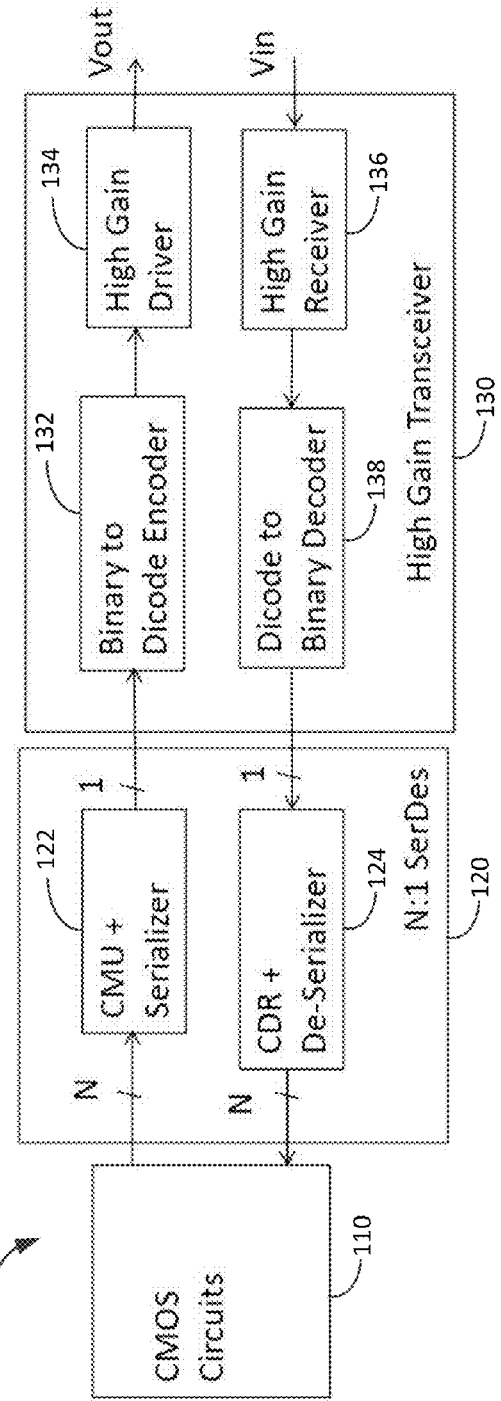
FIG. 2 is a block diagram of an integrated circuit according to an embodiment of the present invention.

FIG. 2 is a block diagram of integrated circuit 100 according to an embodiment of the present invention. Integrated circuits 100 may include circuits 110. These circuits may provide and receive parallel data to and from serializer 122 and deserializer 124. Serializer 122 may provide binary data to high-gain transceiver 130. Specifically, serializer 122 may provide binary data to encoder 132. Encoder 132 may provide encoded data to high-gain driver 134, which may in turn transmit the encoded data. It is to be understood that this block diagram is for illustrative purposes only and that different circuit implementations for high-gain transceiver 130 is possible. For example, encoder 132 may be designed to operate in high-gain state such that it can drive the encoded data without the need for separate high-gain driver 134, or a high-gain driver can be part of encoder 132.

High-gain transceiver 130 may similarly receive encoded data. Specifically, high-gain receiver 136 may receive high-speed encoded data, and provide it to decoder 138. Decoder 138 may decode the data and provide it to deserializer 124.

In this example, the serial data to be encoded is binary. For instance, this data may be NRZ binary data. Serializer 122 and deserializer 124 may serialize or parallelize this data by a factor shown here as "N." In other embodiments of the present invention, serializer 122 and deserializer 124 may receive and provide parallel data having widths that are different from each other. In other embodiments of the present invention, the encoders and decoders may receive and provide multiple bits at a time. An example is shown in the following figure.

Figure 3:
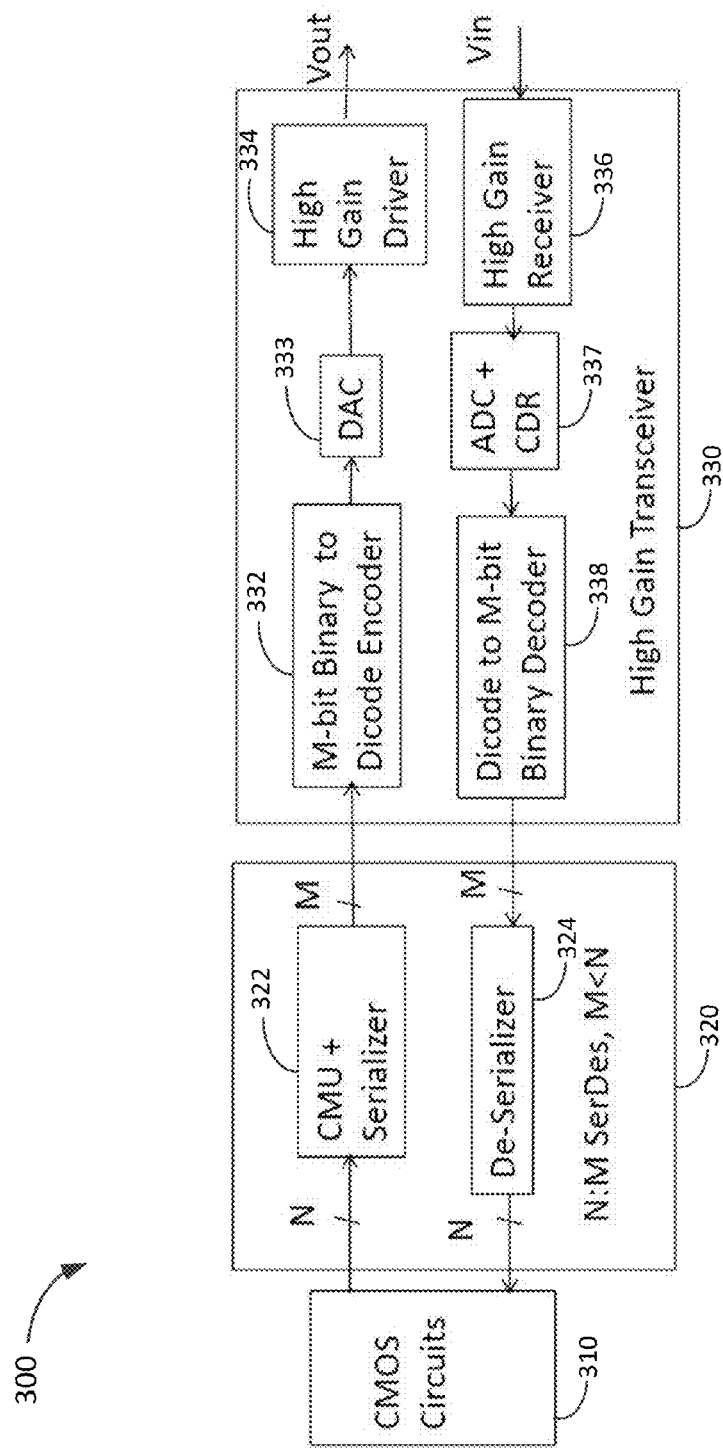
FIG. 3 illustrates a serializer and a deserializer circuit according to one embodiment of the present invention.

FIG. 3 illustrates an integrated circuit 300 having circuits 310 providing and receiving parallel data of "M" bits to serializer 332 and deserializer 324. Serializer 322 may provide "M-bit" binary words to encoder 332 and high-gain transceiver 330. Encoder 332 may provide these words to a digital-to-analog converter DAC 333. Digital-to-analog converter 333 may drive high-gain driver 334, which may transmit the decoded signal. Again, the embodiment shown in FIG. 3 can be subject to different implementations where, for example, there may not be a need for separate driver 334 or a driver can be implemented as part of DAC 333.

Similarly, high-gain receiver 336 may receive an encoded signal and provide it to an analog-to-digital converter and clock-and-data recovery circuit 337. Analog-to-digital converter and clock-and-data recovery circuit 337 may digitize the incoming signal and extract a clock signal, and provide these to decoder 338. Decoder 338 may provide "M-bit" wide words to deserializer 324. Deserializer 324 may provide parallel data to circuits 310.

Again, embodiments of the present invention may use High-Gain Signaling to achieve high data rates. High-Gain Signaling may be again be defined as a combination of high-pass shaping of the signal spectrum and high-gain operation of the circuits and active components. As seen from the above examples, embodiments of the present invention may encode data in order to provide the high-pass shaping of the signal spectrum for high-speed transmission. In various embodiments of the present invention, data may be encoded such that it has an average value that is independent of the data being transmitted. In this and other embodiments of the present invention, in the frequency spectrum, the binary serial data may be frequency shaped upwards as it is encoded. That is, the encoding may convert a data signal having a low-pass or flat-band (or "white") characteristic into a data signal having a high-pass characteristic. The encoded signal may have a reduced or eliminated DC component. One example of how this may be done is by employing dicode encoding. Examples of dicode encoding and decoding and circuitry that may be employed are shown in the following figures.

Figure 4:
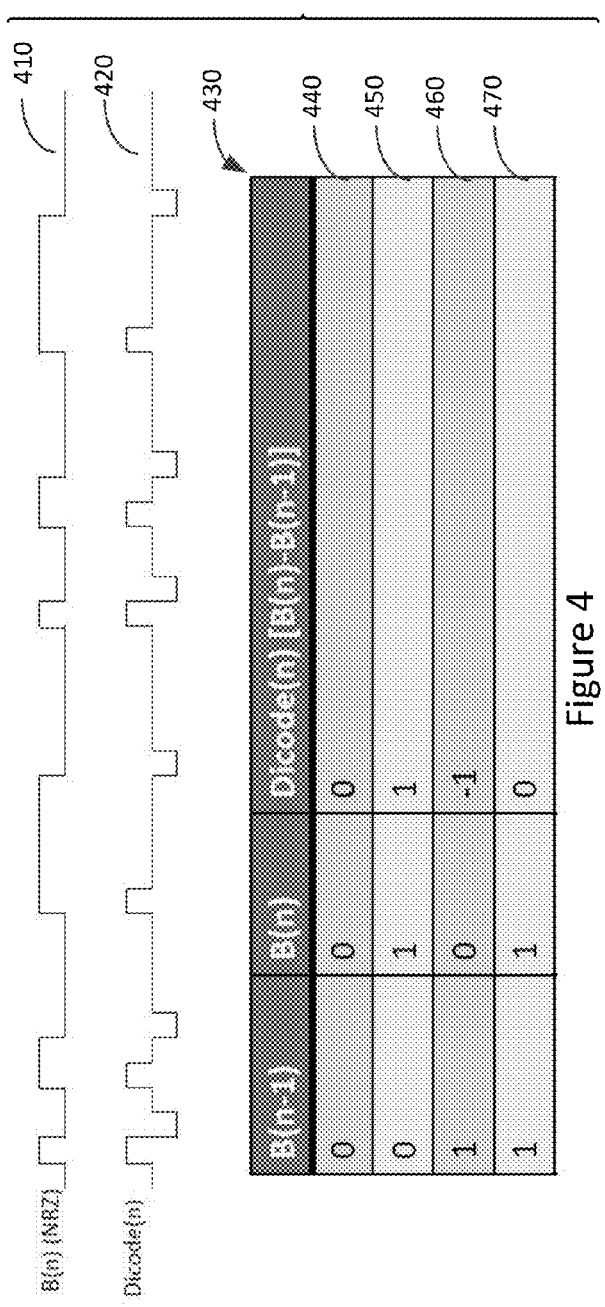
FIG. 4 illustrates a method of dicode encoding that may be employed by embodiments of the present invention.

FIG. 4 illustrates a method of dicode encoding that may be employed by embodiments of the present invention. In this example, input signal 410 is an NRZ signal. Output signal 422 is a three level encoded signal that may be encoded using chart 430. Chart 430 illustrates that a dicode encoded signal results by taking the value of current bit B(n) and subtracting the value of the immediately preceding bit B(n−1), or $(1-z^{-1})$. As shown on lines 440 and 470 when, in the data signal bit stream, a bit B(n) and its previous bit B(n−1) are the same, the encoded output is a zero. Chart 430 further shows that when a transition occurs between a bit and its previous bit, the output is in the direction of that transition. Specifically, following a transition from a zero to a one, the encoded output is a one, as shown on line 450. Conversely, when a transition is from a one to a zero, the following output of the encoder is a negative one, as shown on line 460. As can be seen from encoded signal 120, under no condition does the signal remain at a positive one state or a negative one state for more than one bit. This may result in a higher frequency signal that is DC balanced.

Figure 5:
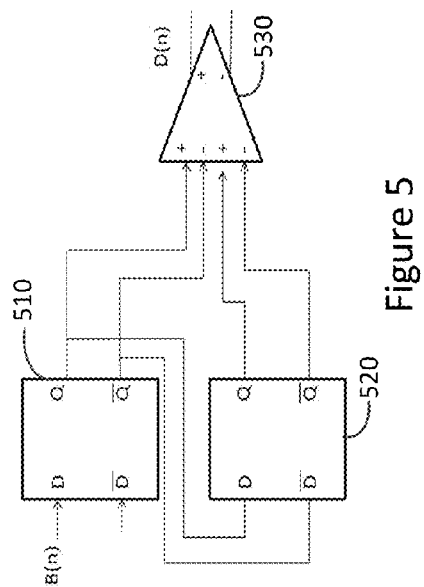
FIG. 5 illustrates an example of an encoder according to an embodiment of the present invention.

FIG. 5 illustrates an example of an encoder that may be employed by embodiments of the present invention. Registers 510 and 520 may be coupled as a two-bit shift register. The outputs of these shift registers may be subtracted by difference-amplifier 530, which may provide the encoded output. Other embodiments of the present invention may employ other types of encoders.

Figure 6:
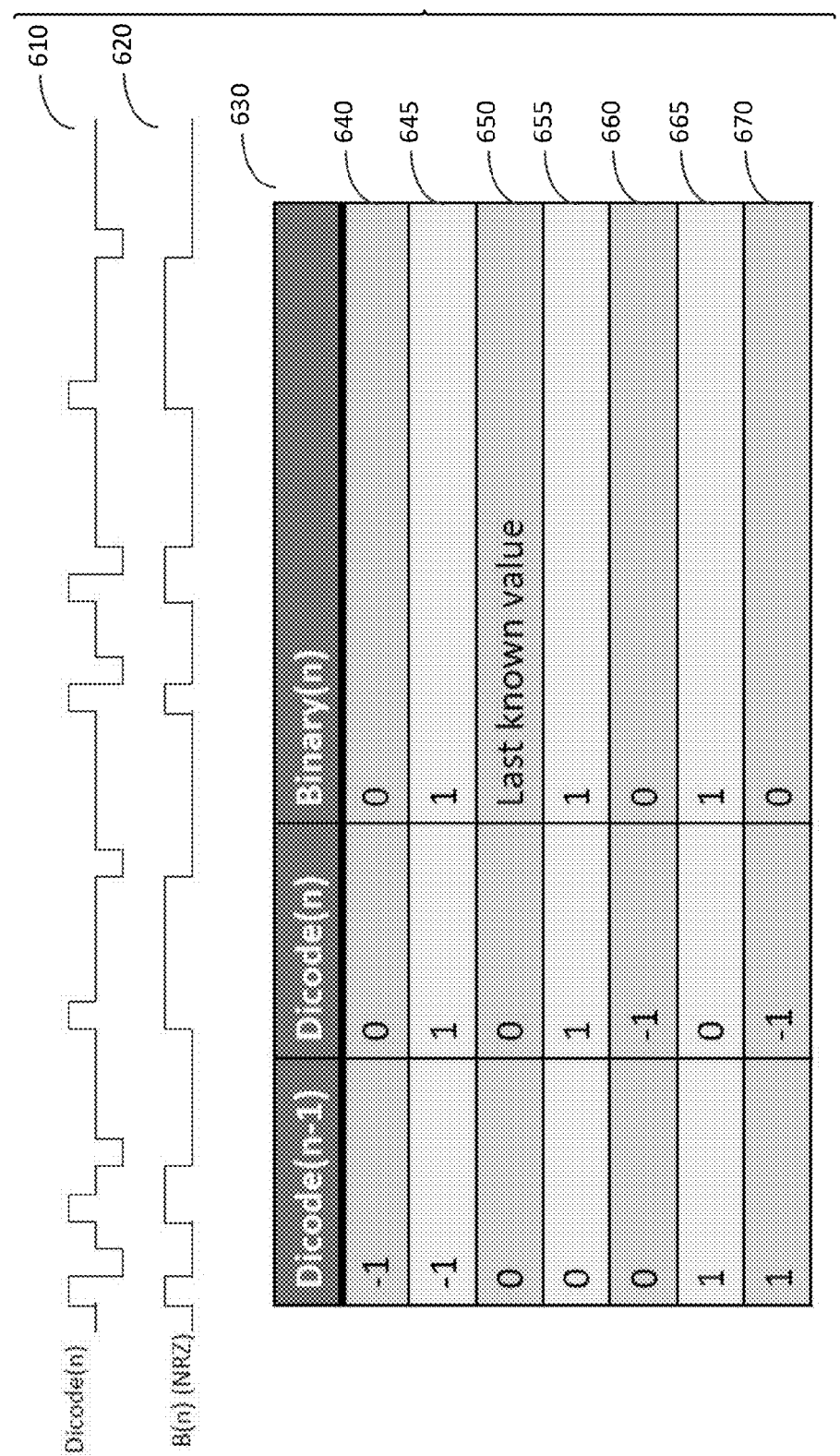
FIG. 6 illustrates a method of dicode decoding that may be employed by embodiments the present invention.

FIG. 6 illustrates a method of dicode decoding that may be employed by embodiments the present invention. In this example a received dicode signal 610 may be decoded to NRZ data 620 using chart 630. As explained above, in a dicode encoded signal, consecutive dicode bits, each having a value of one or negative one, do not occur. When consecutive dicode bits having values of zero occur, the output decoded value remains at the last output value, as shown in line 650 in chart 630. When the transition is between a zero and a negative one, the decoder provides an output of zero, as shown in lines 640 and 660 of chart 630. Conversely, when the transition is between a zero and a one, the decoder provides an output of zero, as shown in lines 655 and 665. An increase from negative one to one generates a decoded one, while a decrease between these values generates a negative one, as shown in lines 645 and 670.

Figure 7:
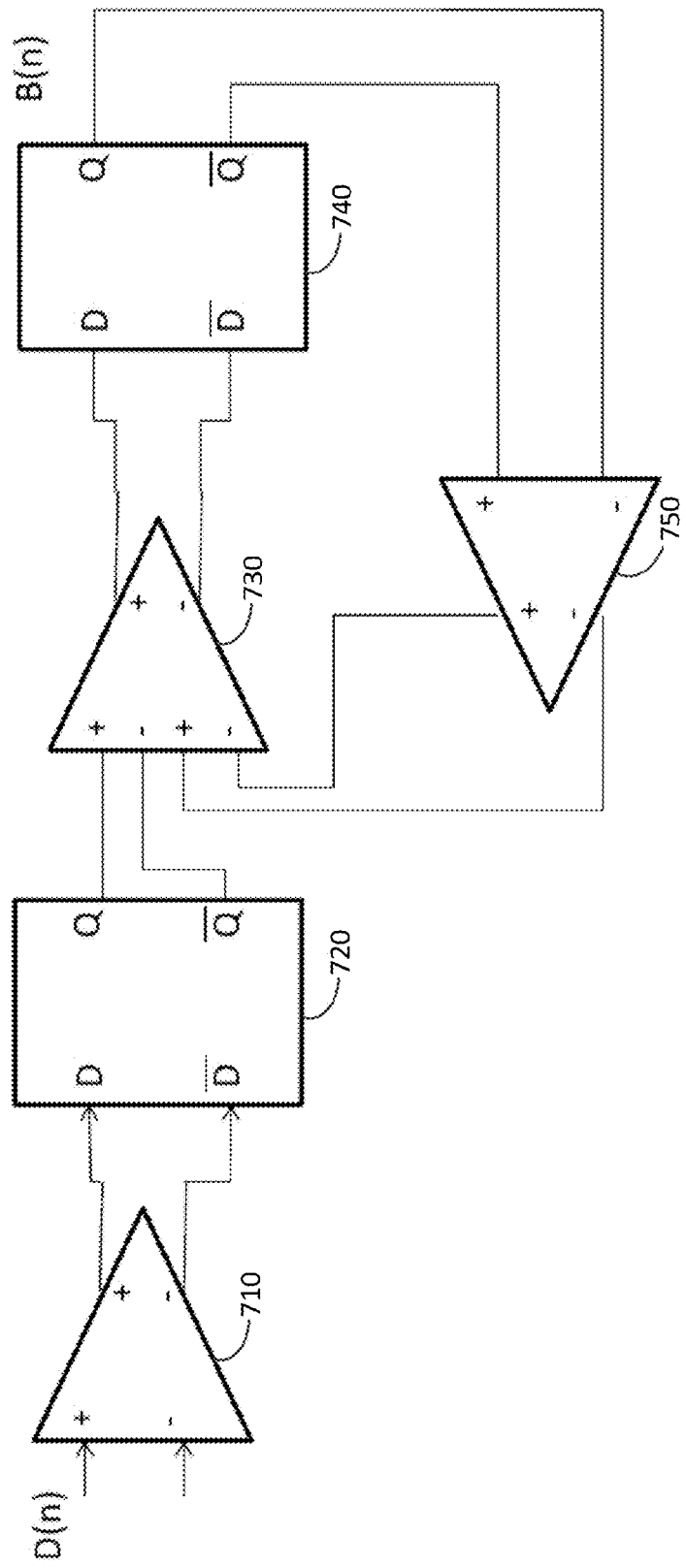
FIG. 7 illustrates an example of a decoder according to an embodiment of the present invention.

FIG. 7 illustrates an example of a decoder that may be employed by embodiments of the present invention. In this example, a current value of the incoming dicode signal is subtracted from decoded signal by difference-amplifier 730. Again, in other embodiments of the present invention, other types of decoders may be employed.

It is possible to employ other types of encoding schemes that substantially reduce low frequency components of the encoded signal. A modified version of the above described dicode encoding may introduce a coefficient f to the encoding process that varies the weight of bit B(n−1). That is, instead of a full B(n−1), some fraction of B(n−1) can be subtracted from B(n), i.e., $(1-fz^{-1})$, where f may be, for example, a fraction that is close to 1, such as 0.9. This variation on the dicode encoding scheme will be referred to herein as modified dicode encoding. Another possible encoding scheme that substantially reduces low frequency components of the signal is modified duobinary encoding. Modified duobinary encoding is based on taking the value of a current bit B(n) and subtracting the value of not the immediately preceding bit, but the one before that, or $(1-z^{-2})$. This encoding scheme also removes the DC component of the signal, although in frequency domain, it results in a signal that has a band-pass characteristic as opposed to the high-pass characteristic of the dicode encoded signal. Because transmission channels typically exhibit low-pass characteristics, in some applications, the high-pass shaping of the signal that results from dicode encoding is preferred to the band-pass shaping of the signal that results from modified duobinary encoding of the signal. However, modified duobinary encoding can also be employed in various embodiments of the present invention.

Drivers and receivers, such as high-gain driver 134 and high-gain receiver 136 above, may have driving capabilities that are bandwidth-limited. These limitations may be exacerbated by parasitic components such as packaging capacitance, inductance, and resistance, interconnect trace capacitance, resistance, and inductance, among others. The bandwidth capabilities of these drivers and receivers may be improved by operating them in a high-speed or small-signal range.

As explained above, encoding the signals to be transmitted as dicode signals has the effect of pushing the frequency components of the encoded signal higher in frequency. Embodiments of the present invention may utilize this frequency shifting to help ensure that the transmitters and receivers are operating in the higher speed small-signal range and to take advantage of the equalization that results as the encoded signal travels through a low-pass communication channel. This is shown further in the following figure.

Figure 8:
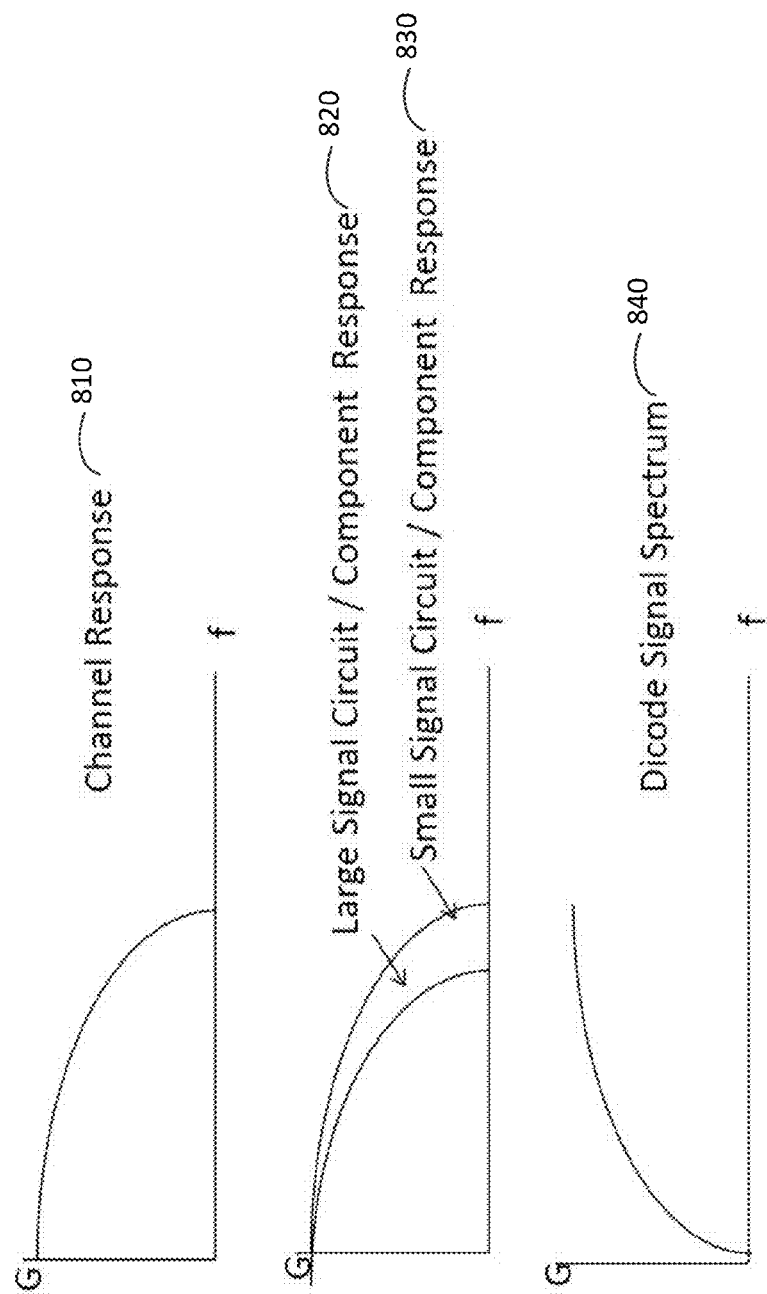
FIG. 8 illustrates frequency responses for various parts of a system according to an embodiment of the present invention.

FIG. 8 illustrates frequency responses for various parts of a system according to an embodiment of the present invention. An typical channel response 810 for a transmit and receive path is illustrated. As can be seen, the channel response rolls off as a function of increasing frequency. This roll-off occurs at lower frequencies when the circuits are operating in their large signal range, as is shown by curve 820, while the roll-off occurs at higher frequencies when the circuits are operating in their small-signal ranges.

The spectrum 840 of a dicode signal is also shown. Passing a signal having this spectrum through a channel response such as response 830 may result in an overall bandpass response. As described above, this resulting equalization minimizes ISI and improves overall system performance. The various frequency components passing through a bandpass filter have minimal delay differences between them. This may result in a data transfer where various data patterns are transmitted and received with minimal skew.

By passing the signal spectrum 840 through transmitters and receivers having responses like response 830, the transmitters and receivers will be operating in their small-signal ranges. From a time-domain perspective, the high-frequency data and limited bandwidth channel keeps circuits in the transmit and receive path from fully switching, which may prevent the paths' various stray capacitances from becoming fully charged or discharged and keeps active components out of their saturation regions. This may allow a fast reaction to changes in the input data. From a frequency spectrum perspective, this encoding shifts an input signal having a low-pass characteristic to an encoded signal having a high-pass characteristic. Again, this keeps the transmitting and receiving circuits operating in their linear or small-signal ranges, which is the operating range where these circuits have their highest bandwidth. For example, if the receiver includes an input amplifier, the amplifier may operate in its small-signal range. An example is shown in the following figure.

Figure 9:
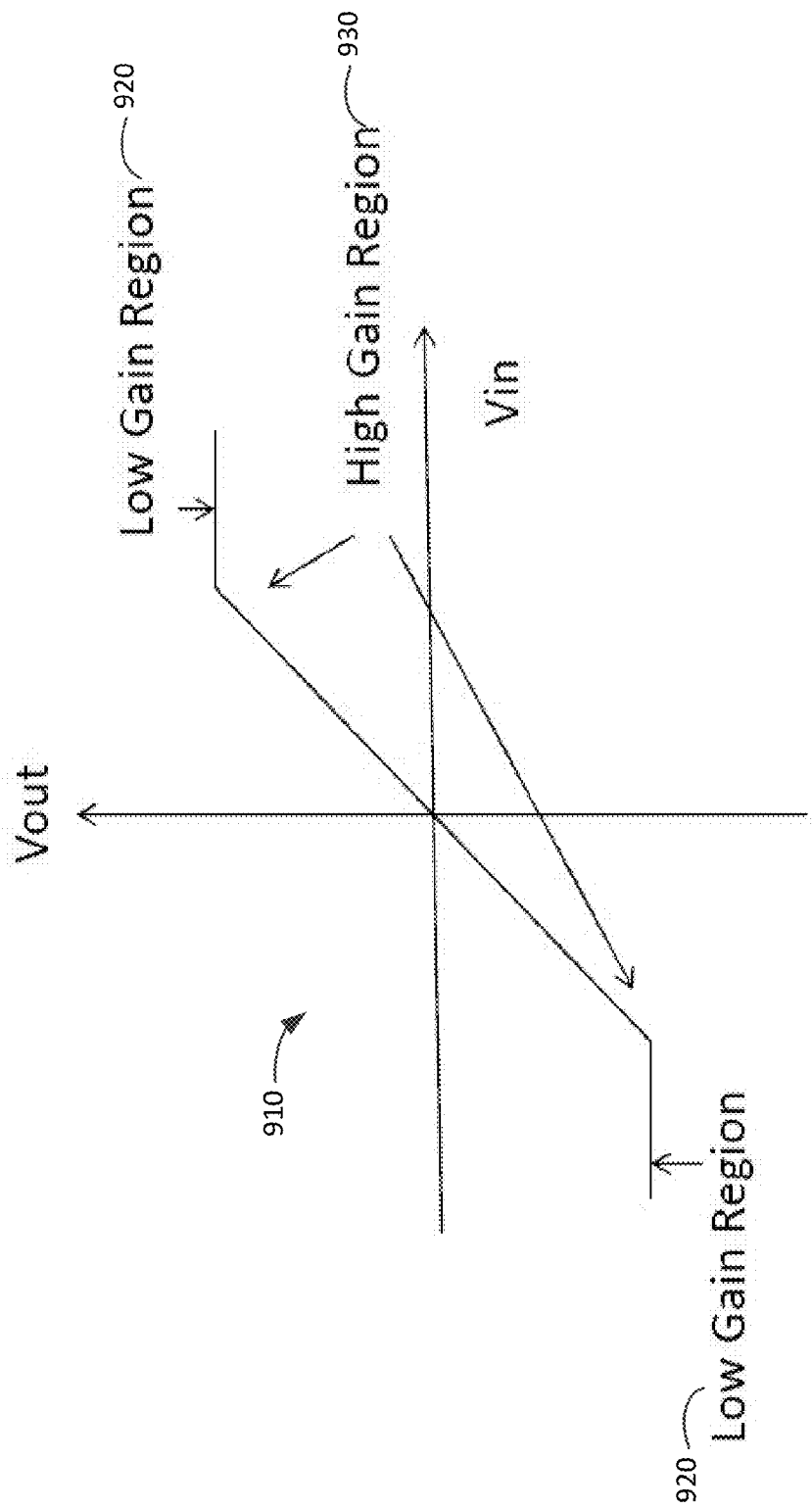
FIG. 9 illustrates the transfer characteristics for an amplifier according to an embodiment of the present invention.

FIG. 9 illustrates the transfer characteristics for an amplifier that may be used in an embodiment of the present invention. On each side of its zero state, the amplifier may operate in a small-signal, high-gain, high-bandwidth region 930. Above that region, response time may roll off in low-gain or large-signal regions 920. Accordingly, these amplifiers may be connected to operate near the midpoint of high-gain region 930. These amplifiers may be biased such that they at least substantially, or exclusively, operate in their small-signal region when receiving and transmitting data. That is, they may operate such that the levels of the input signals do not drive them into low-gain region 920. It should be noted that if amplifiers, or other circuits in the transmit or receive path, are driven into low-gain regions 920, the response times may increase, and zero crossings of encoded or decoded data may be pushed out or delayed in time. Again, the combination of this high-gain operation with the high-pass shaping achieved as a result of encoding may form the basis of High-Gain Signaling, which may be employed by embodiments of the present invention.

Embodiments of the present invention may transmit and receive data over various types of connections, including optical connections. Examples of this are shown in the following figures.

Figure 10:
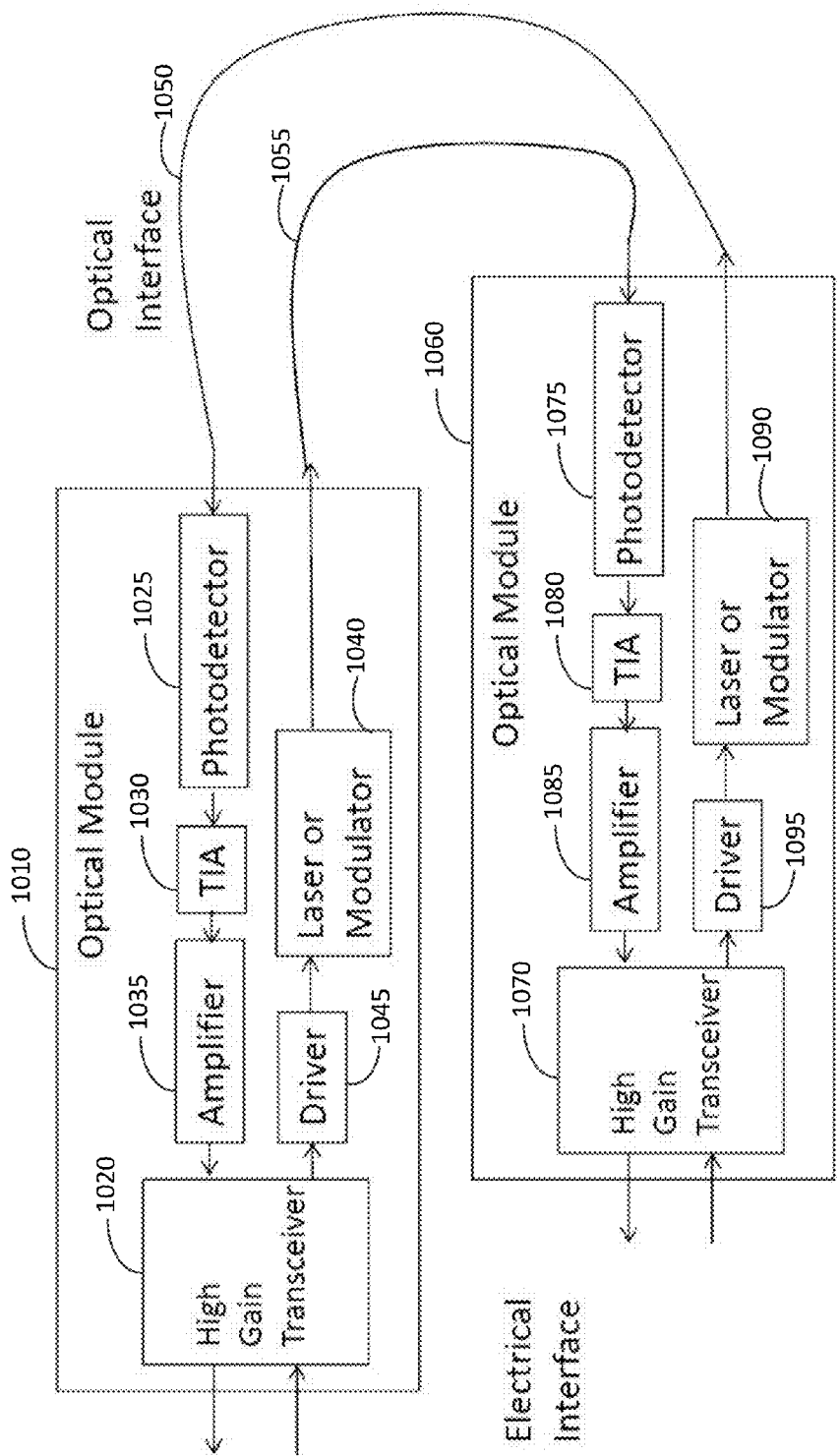
FIG. 10 illustrates optical modules consistent with embodiments of the present invention connected to communicate with each other over fiber-optic cables.

FIG. 10 illustrates optical modules 1010 and 1060 connected to communicate with each other over fiber-optic cables 1050 and 1055. In various embodiments of the present invention, optical modules 1010 and 1060 may be all or partially integrated with one or more other integrated circuits. In this example, high-gain transceiver 1020 in module 1010 may provide an output to driver 1045, which may in turn drive a laser or modulator 1040. The output from laser or modulator 1040 may be provided on fiber-optic cable 1055 and received by photodetector 1075 in optical module 1060. Photodetector 1075 may drive trans-impedance amplifier 1080, which may in turn drive amplifier 1085. Amplifier 1085 may, in turn, drive high-gain transceiver 1070.

Similarly, high-gain transceiver 1070 in optical module 1060 may provide an output to driver 1095, which may drive modulator 1090. The output of laser or modulator 1090 may be provided on fiber-optic cable 1050, and received by photodetector 1025 in optical module 1010. Photodetector 1025 may provide an output to trans-impedance amplifier 1030, which may in turn drive amplifier 1035. Amplifier 1035 may provide an output to high-gain transceiver 1020.

Again, some or all of optical modules 1010 and 1060 may be included in one or more integrated circuits. An example is shown in the following figures.

Figure 11:
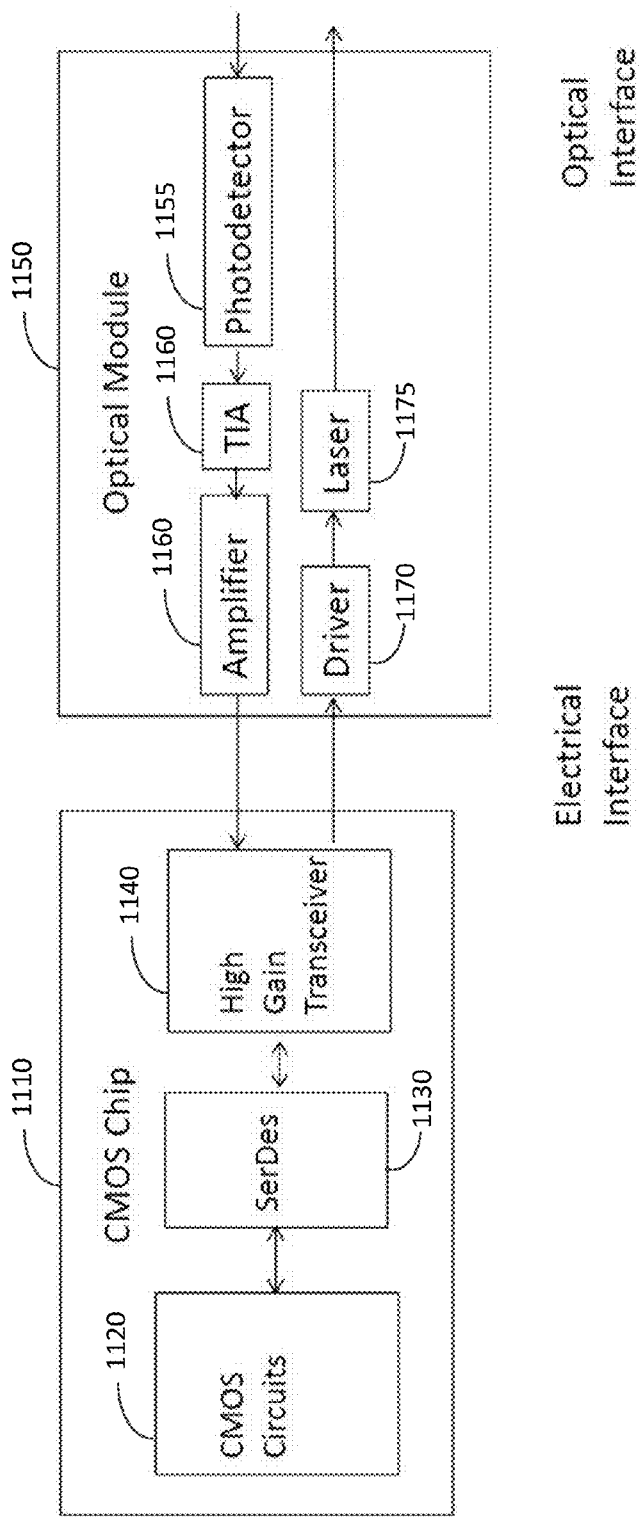
FIG. 11 illustrates an integrated circuit and optical module according to an embodiment of the present invention.

FIG. 11 illustrates an integrated circuit and optical module according to an embodiment of the present invention. In FIG. 11, high-gain transceiver 1140 may be included on an integrated circuit 1110 with circuits 1120 and serializer-deserializer circuits 1130. Optical module 1150 may include a photodetector 1155 for receiving a fiber-optic signal, trans-impedance amplifier 1160, and amplifier 1160. Optical model 1150 may further include driver 1170 and laser 1175.

Figure 12:
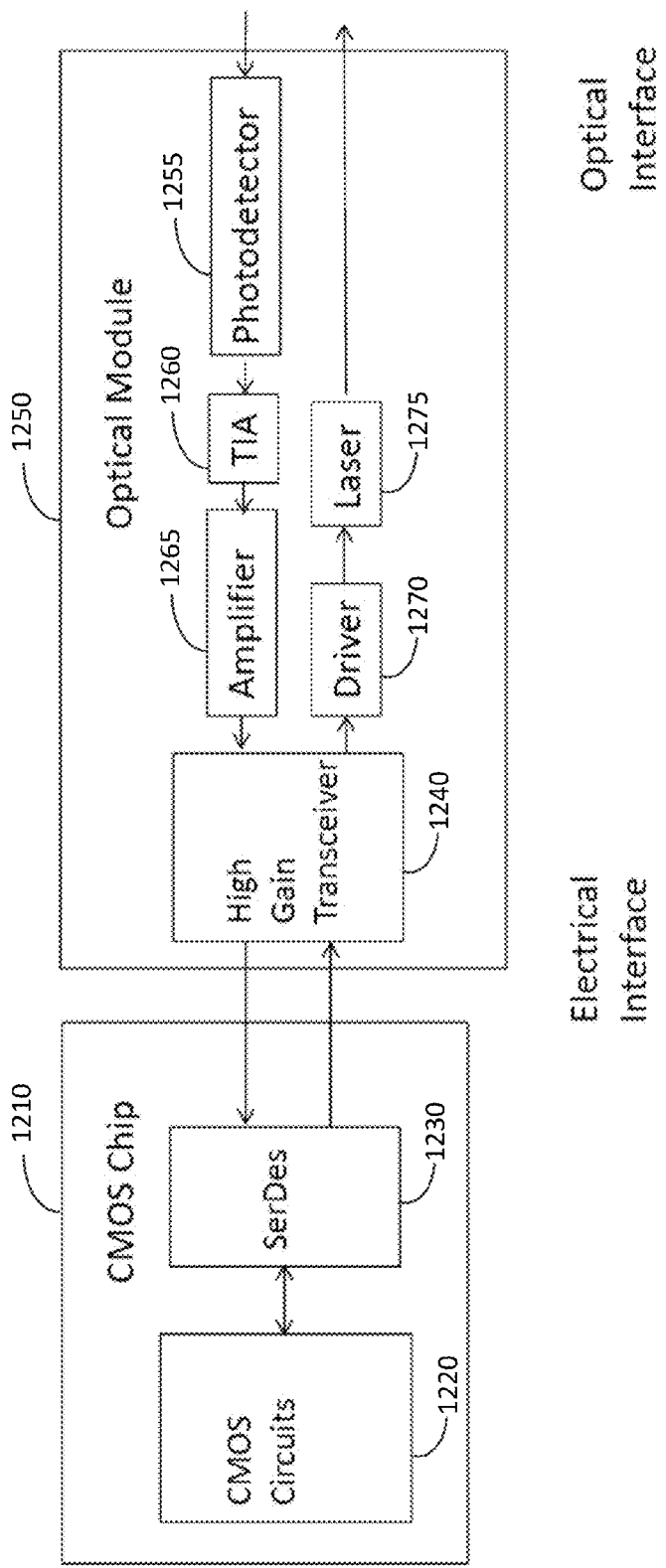
FIG. 12 illustrates another integrated circuit and optical module according to an embodiment of the present invention.

FIG. 12 illustrates another integrated circuit and optical module according to an embodiment of the present invention. In FIG. 12, high-gain transceiver 1240 has been moved to optical module 1250.

Circuits in the transmit and receive paths may be biased in their small-signal, high-gain regions. For example, laser 1275 may be biased such that it at least substantially, or exclusively, operates in its small-signal region when receiving and transmitting data. An example is shown in the following figure.

Figure 13:
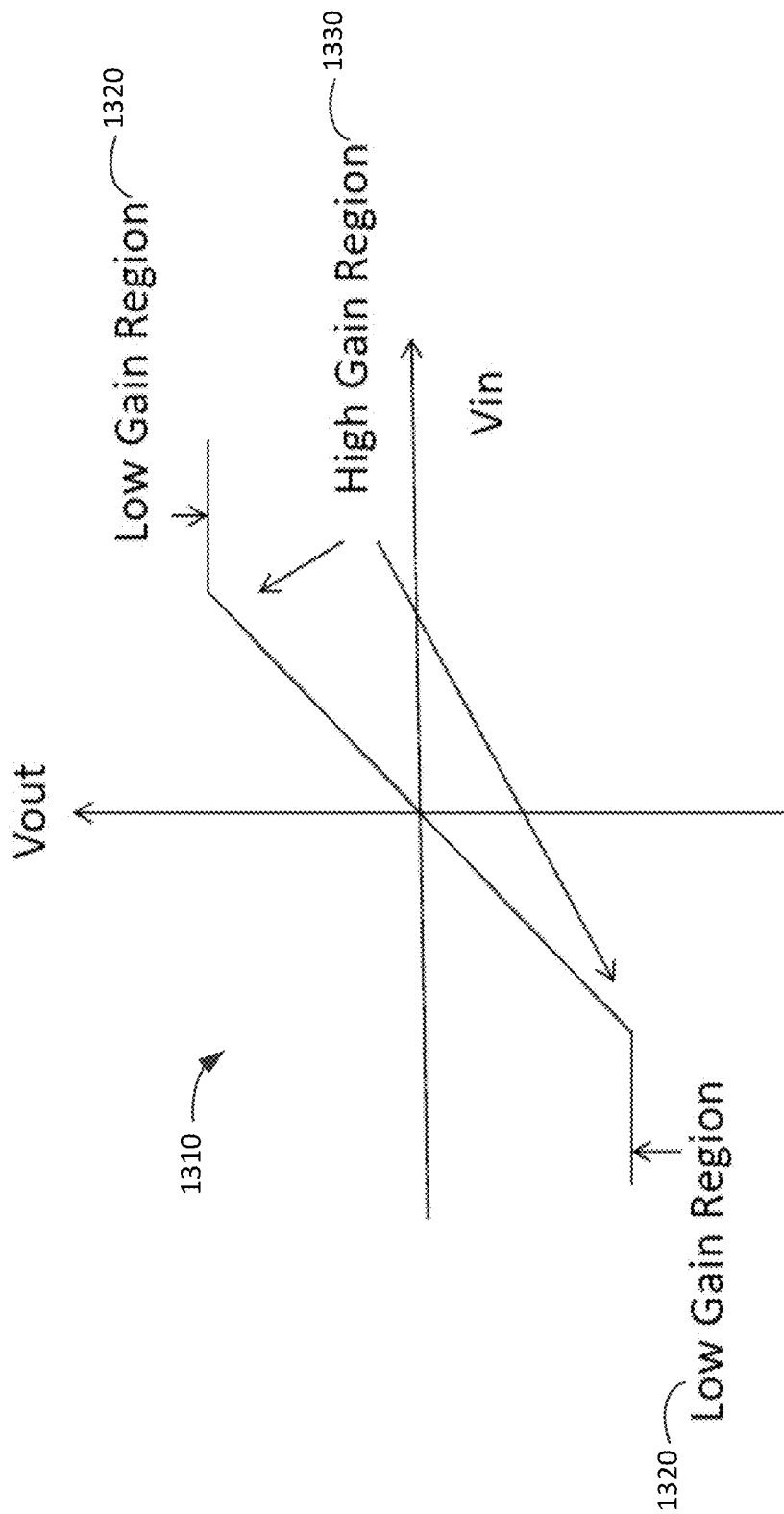
FIG. 13 illustrates a transfer characteristic for a laser operating in a manner consistent with embodiments of the present invention.

FIG. 13 illustrates a transfer characteristic for a laser operating in a manner consistent with embodiments of the present invention. This laser may have a small-signal or high-gain region 1330. Above and below that range, the laser may have a low gain region 320. Accordingly, laser 1275, and other circuits similarly employed by embodiments of the present invention, may be biased near a center of a high-gain region 330. This may be accomplished by applying a DC bias current to the laser. Current in the laser may then be increased and decreased such that the laser 1275 at least substantially or exclusively remains in the small-signal, high-gain region 330 while transmitting data.

Similarly, photodetectors, such as photodetector 1255, may similarly be biased near the center of their small-signal, high-gain region. An example of this is shown in the following figure.

Figure 14:
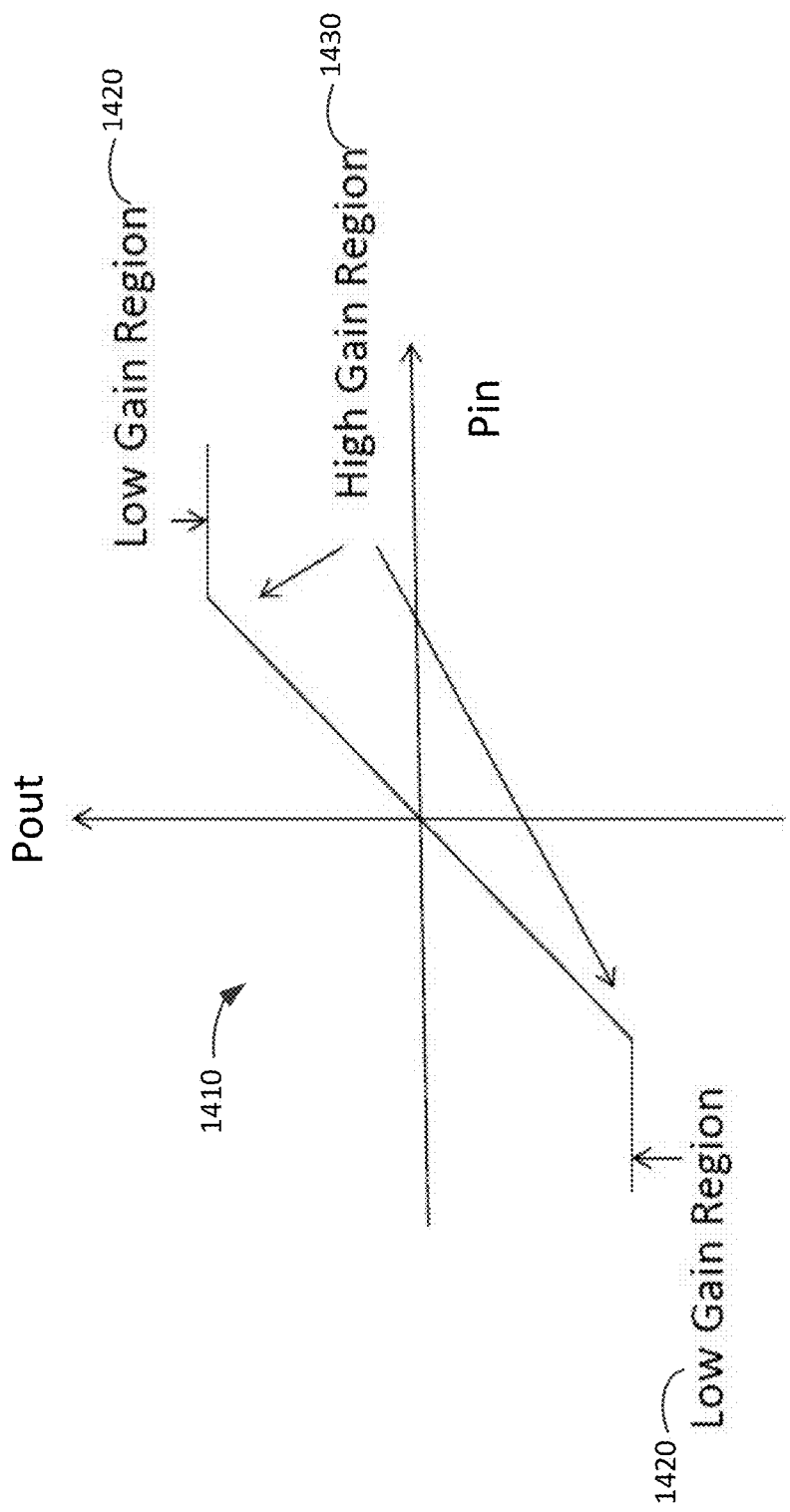
FIG. 14 illustrates a transfer characteristic for a photodetector employed by embodiment of the present invention.

FIG. 14 illustrates a transfer characteristic for a photodetector employed by embodiments of the present invention. The photodetector may have a high-gain region 1430 bounded at high and low ends by low-gain or large-signal region 1420. Similar to the laser above, the photodetector may be biased with a DC current near the center of the small-signal, high-gain region 1430. Data transitions may cause the photodetector to transition through high-gain region 1430.

In various embodiments of the present invention, instead of varying a current through a laser, light from the laser itself may be varied or modulated by a modulator. Examples of this are shown in the following figures.

Figure 15:
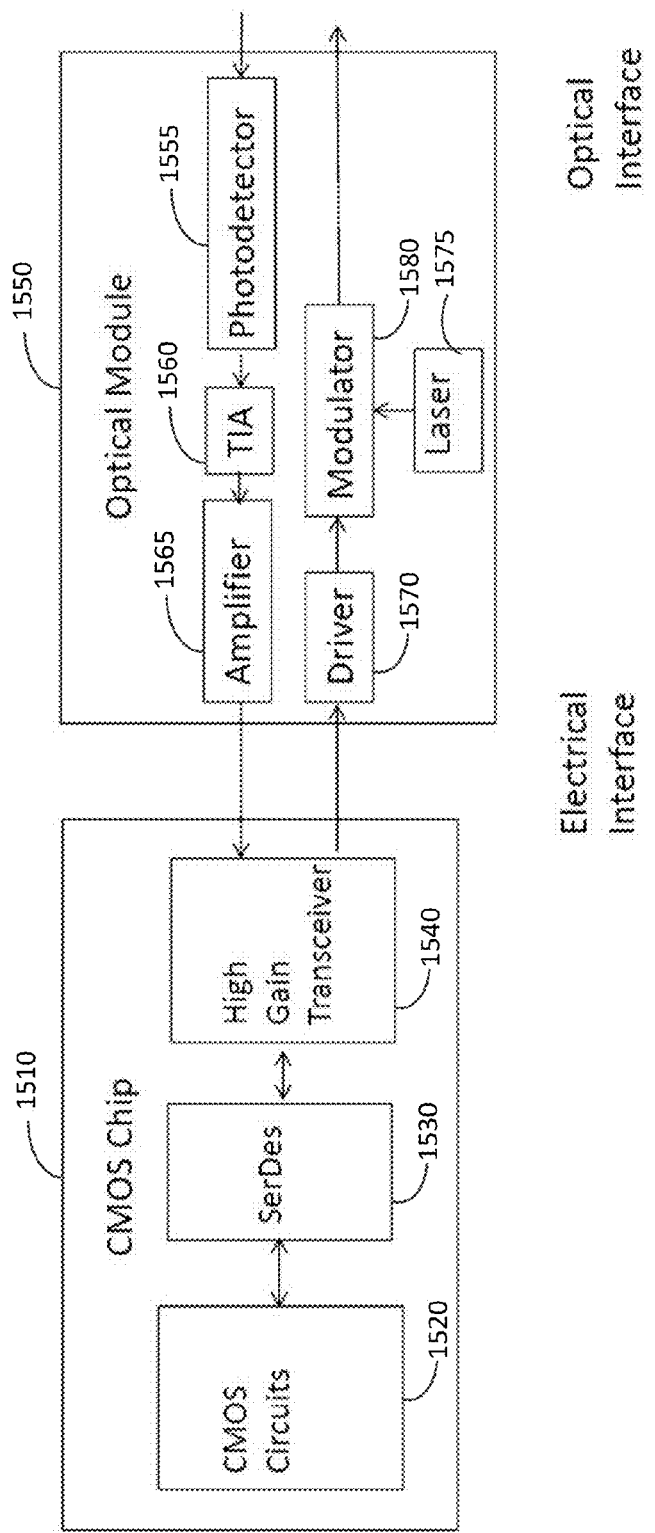
FIG. 15 illustrates an integrated circuit and optical module according to an embodiment of the present invention.

FIG. 15 illustrates an integrated circuit 1510 and optical module 1550 according to an embodiment of the present invention. In FIG. 15, high-gain transceiver 1540 may be included on an integrated circuit 1510 with circuits 1520 and serializer-deserializers 1530. Optical module 1550 may include a photodetector 1555 for receiving a fiber-optic signal, trans-impedance amplifier 1560, and amplifier 1560. Optical model 1550 may further include driver 1570, laser 1575, and modulator 1580.

Figure 16:
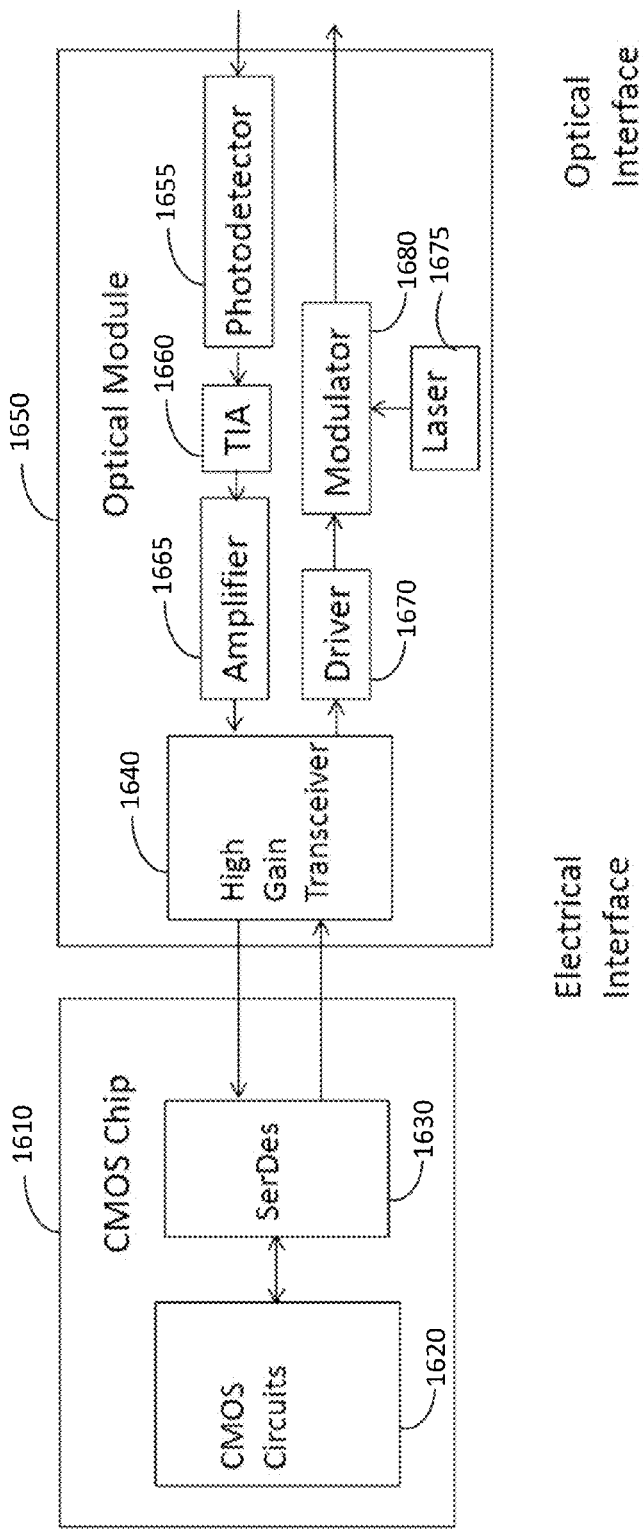
FIG. 16 illustrates another integrated circuit and optical module according to an embodiment of the present invention.

FIG. 16 illustrates another integrated circuit and optical module according to an embodiment of the present invention. In FIG. 16, high-gain transceiver 1640 has been moved to optical module 1650.

As before, circuits in the transmit and receive paths may be biased in their small-signal, high-gain regions. For example, modulator 1275 may be biased such that it at least substantially, or exclusively, operates in its small-signal region when transmitting data. An example is shown in the following figure.

Figure 17:
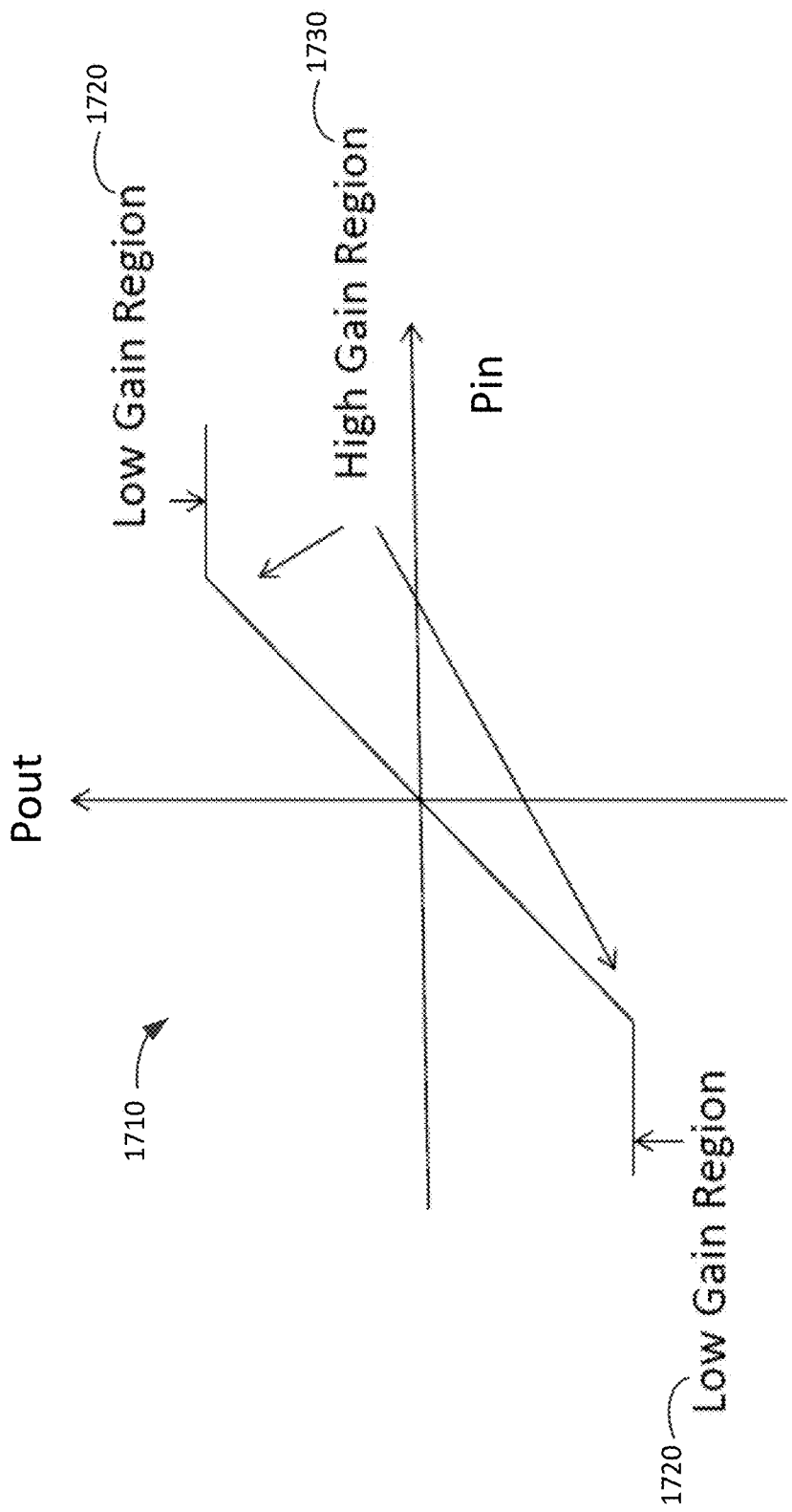
FIG. 17 illustrates a transfer characteristic for a modulator operating in a manner consistent with embodiments of the present invention.

FIG. 17 illustrates a transfer characteristic for a modulator operating in a manner consistent with embodiments of the present invention. This modulator may have a small signal or high-gain region 1330. Above and below that range, the modulator may have a low gain region 320. Accordingly, modulator 1275, and other circuits similarly employed by embodiments of the present invention, may be biased near a center of a high-gain region 330. This may be accomplished by applying a bias to the modulator. The modulation may then be increased and decreased such that the modulator 1275 at least substantially or exclusively remains in the small-signal, high-gain region 330 while transmitting data.

Figure 18:
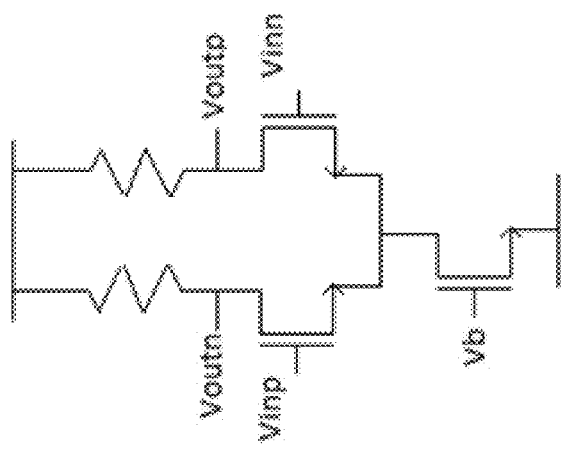
FIG. 18 is an exemplary transistor-level diagram for a circuit that can operate as an amplifier, a buffer or a driver and which can be biased to operate in its high-gain region.
Figure 19:
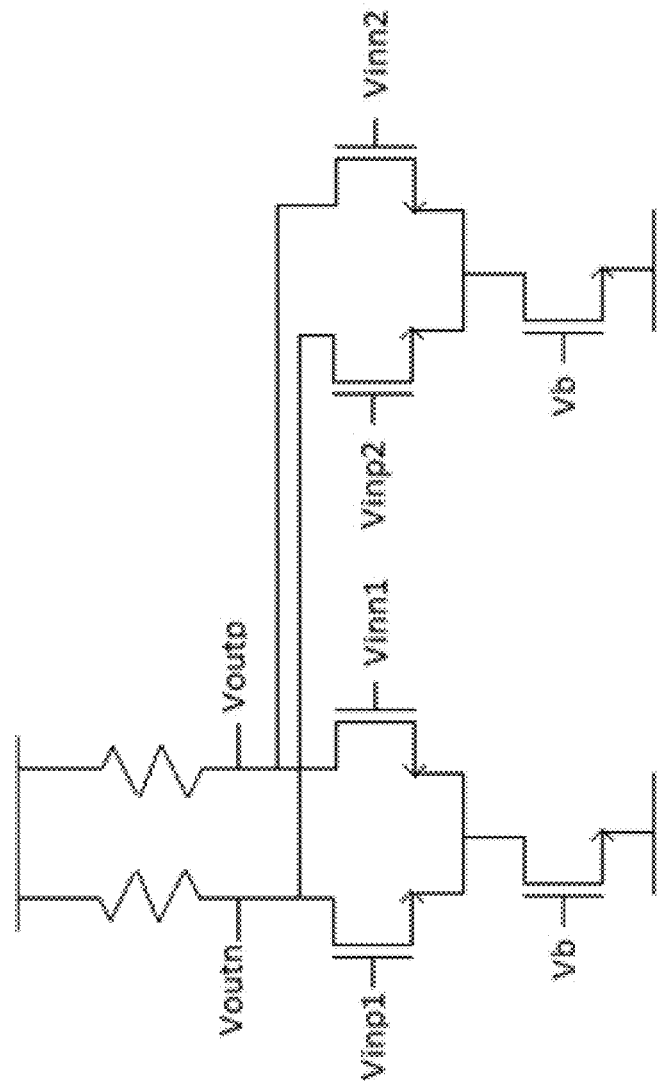
FIG. 19 is an exemplary transistor-level diagram for a difference amplifier circuit that can be biased to operate in its high-gain region.
Figure 20:
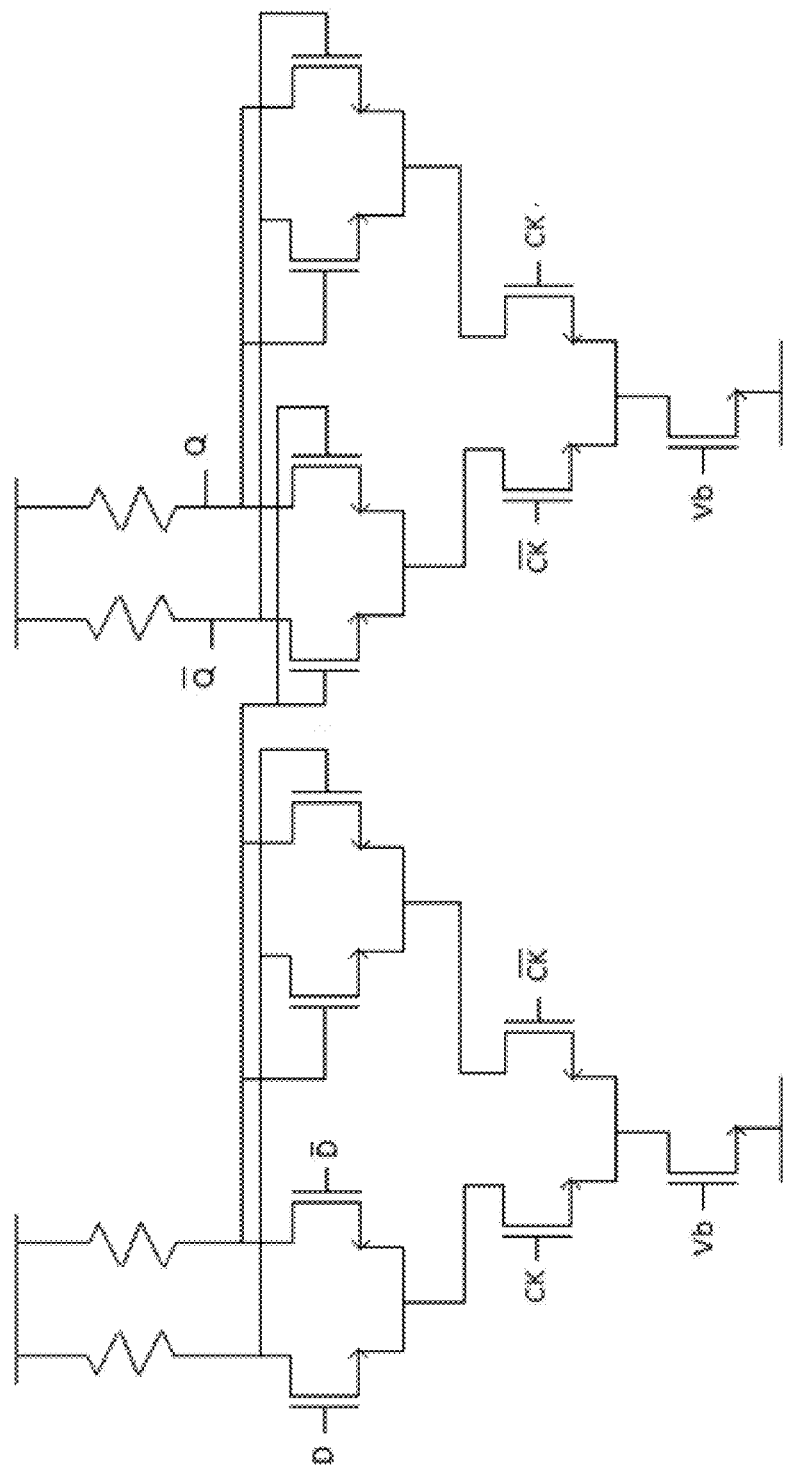
FIG. 20 is an exemplary transistor-level diagram for a flip-flop or register circuit that can be biased to operate in its high-gain region.

To better understand the higher speed advantage provided by the various embodiments of the present invention, FIGS. 18, 19 and 20 depict transistor-level circuits for various circuit components that can be biased to operate in their high-gain region. FIG. 18 depicts an exemplary circuit that can implement an amplifier or a buffer or a driver that can be biased to operate in their high-gain region. Examples where such circuits can be employed in various embodiments of the present invention include high-gain drivers 134 and 334 in FIGS. 2 and 3, respectively, or drivers 1045 and 1095 in FIG. 10. FIG. 19 depicts an exemplary circuit that can implement a difference amplifier such as difference amplifiers 530 and 730 employed in dicode encoder of FIG. 5 and dicode decoder of FIG. 7, respectively. FIG. 20 depicts an exemplary circuit that can implement a D-type flip-flop or register such as 510 and 520 employed in dicode encoder shown in FIG. 5 or 720 and 740 employed in dicode decoder shown in FIG. 7. All these circuits are designed based on current steering logic and can be biased to operate near the center of their high-gain linear region. These circuits respond much faster to transitions at their input because they are biased in their high-gain region, and only depart momentarily and slightly from the center of the linear high-gain region when detecting a transition at their input.

The above description of embodiments of the invention has been presented for the purposes of illustration and description. It is not intended to be exhaustive or to limit the invention to the precise form described, and many modifications and variations are possible in light of the teaching above. For example, different implementations for the circuits and active components depicted and described in the illustrative embodiments are possible. Drivers and amplifiers may not be necessary or may be implemented within other circuit blocks, and there may be a lesser or greater degree of integration of the various system and circuit components within one or more chip packages, modules or boards. Also, circuits and active components that are conditioned to operate in their high-gain or linear region may not do so exclusively at all times, and there may be conditions under which they depart from their high-gain state. The exemplary embodiments described herein were chosen in order to best explain the principles of the invention and its practical applications to thereby enable others skilled in the art to best utilize the invention in various embodiments and with various modifications as are suited to the particular use contemplated. Thus, the invention is intended to cover all modifications and equivalents within the scope of the following claims.

What is claimed is:

1. A transmitter comprising:
an encoder having at least one input adapted to receive a data signal, the encoder to encode the data signal into an encoded multi-level data signal having substantially reduced DC and low-frequency components; and
an output stage coupled to receive the encoded multi-level data signal and to transmit the encoded multi-level data signal,
wherein the output stage is configured to have a transfer function that includes a high-gain linear region, and wherein the output stage is conditioned to operate in the high-gain linear region when receiving and transmitting the encoded multi-level data signal.

2. The transmitter of claim 1 wherein the output stage is conditioned to operate near a center of the high-gain linear region and remains substantially in its high-gain linear region when transmitting the encoded multi-level data signal.

3. The transmitter of claim 1 wherein the encoding of the data signal substantially reduces DC and low-frequency components of the data signal whereby, in frequency domain, the encoded multi-level data signal has one of a substantially high-pass spectrum or a substantially band-pass spectrum.

4. The transmitter of claim 1 wherein the encoder is configured to encode a non-return to zero (NRZ) data signal to a dicode data signal.

5. The transmitter of claim 1 wherein the encoder is configured to encode a non-return to zero (NRZ) data signal to a modified dicode data signal.

6. The transmitter of claim 1 further comprising a serializing circuit having an output coupled to the at least one input of the encoder.

7. The transmitter of claim 1 wherein the output stage comprises a laser.

8. The transmitter of claim 1 wherein the output stage comprises a modulator.

9. The transmitter of claim 1 wherein the encoded multi-level data signal is a single-ended signal.

10. The transmitter of claim 1 wherein the encoded multi-level data signal is a differential signal.

11. The transmitter of claim 1 wherein the encoded multi-level data signal enables AC coupled communication between components.

12. A receiver comprising:
an input stage coupled to receive an encoded multi-level data signal, a decoder having an input coupled to the output of the input stage and adapted to decode the encoded multi-level data signal,
wherein the input stage is configured to have a transfer function that includes a high-gain linear region, and wherein the input stage is conditioned to operate in the high-gain linear region when receiving and outputting the encoded multi-level data signal.

13. The receiver of claim 12 wherein the encoded multi-level data signal has substantially reduced DC and low-frequency components, and wherein the decoder is configured to increase low frequency components when generating a decoded signal.

14. The receiver of claim 12 wherein the decoder is configured to decode a dicode data signal into a non-return to zero (NRZ) data signal.

15. The receiver of claim 12 wherein the decoder is configured to decode a modified dicode data signal into a non-return to zero (NRZ) data signal.

16. The receiver of claim 12 further comprising a deserializing circuit having an input coupled to the output of the decoder.

17. The receiver of claim 12 wherein the encoded multi-level data signal is a single-ended signal.

18. The receiver of claim 12 wherein the encoded multi-level data signal is a differential signal.

19. The receiver of claim 12 wherein the encoded multi-level data signal is AC coupled to the input stage.

20. A method for high speed communication comprising:
encoding a data signal into a multi-level encoded data signal such that the multi-level encoded data signal spectrum has a high-pass characteristic with substantially reduced DC and low-frequency components;
applying the multi-level encoded data signal to a driver circuit having a transfer function that includes a high-gain linear region;
conditioning the driver circuit to operate in its high-gain linear region when receiving and transmitting the multi-level encoded data signal; and
transmitting the multi-level encoded data signal.

21. The method of claim 20 further comprising serializing the data signal prior to encoding the data signal.

22. A data communication system comprising:
an interface for coupling to a communication channel, the interface including a high-gain transceiver section, the high-gain transceiver section having a high-gain receiving unit and a high-gain transmitting unit,
wherein the high-gain receiving unit includes a high-gain receiver circuit that is biased to operate in its high-gain linear region when receiving and processing a multi-level encoded data signal with substantially reduced DC and low-frequency components, and a decoder coupled to the high-gain receiver circuit, the decoder to convert the multi-level encoded data signal into a decoded data signal with substantially increased low frequency components, and
wherein the high-gain transmitting unit includes an encoder to convert a data signal into a multi-level encoded data signal with substantially reduced DC and low-frequency components, and a high-gain driver circuit coupled to the encoder, and wherein the high-gain driver circuit is biased to operate in its high-gain linear region when receiving and processing the multi-level encoded data signal.

23. The data communication system of claim 22 wherein the interface further comprises a serializer coupled to the encoder in the high-gain transmitting unit, and a deserializer coupled to the decoder in the high-gain receiving unit.

24. The data communication system of claim 22 wherein the interface further comprises optical components for facilitating communication with an optical channel, the optical components including, in a receive path, a photodetector coupled to receive an optical signal from the optical channel and an amplifier coupled between the photodetector and the high-gain transceiver, the optical components further including, in a transmit path, a driver coupling the high-gain transceiver to one of a laser or modulator.

25. The data communication system of claim 22 wherein one or more of the amplifier, photodetector, modulator or laser are biased to operate in high-gain linear regions when receiving and processing a signal.

26. The data communication system of claim 22 wherein, in the frequency domain, the multi-level encoded data signal has high-pass characteristics and wherein the high-pass characteristics of the multi-level encoded data signal provides for some equalization of low-pass characteristics of the communication channel.

27. The data communication system of claim 22 wherein the encoded multi-level data signal is a single-ended signal.

28. The data communication system of claim 22 wherein the encoded multi-level data signal is a differential signal.

29. The data communication system of claim 22 wherein the encoded multi-level data signal is adapted for a communication channel that is copper based.

30. The data communication system of claim 22 wherein the encoded multi-level data signal enables AC coupled communication between components.

* * * * *